United States Patent [19]

McGarvey

[11] Patent Number: 5,777,989
[45] Date of Patent: Jul. 7, 1998

[54] TCP/IP HOST NAME RESOLUTION FOR MACHINES ON SEVERAL DOMAINS

[75] Inventor: John Ryan McGarvey, Apex, N.C.

[73] Assignee: International Business Machines Corporation, Armonk, N.Y.

[21] Appl. No.: 574,488

[22] Filed: Dec. 19, 1995

[51] Int. Cl.$^6$ ................................................. H04L 12/26
[52] U.S. Cl. .................... 370/254; 370/475; 395/200.79
[58] Field of Search .................................. 370/254–258, 370/392, 475; 395/200.11, 200.79

[56] References Cited

U.S. PATENT DOCUMENTS

| | | | |
|---|---|---|---|
| 4,853,843 | 8/1989 | Ecklund | 364/200 |
| 4,893,307 | 1/1990 | McKay et al. | 370/466 |
| 5,021,942 | 6/1991 | Watson et al. | 364/200 |
| 5,142,622 | 8/1992 | Owens | 395/200 |
| 5,617,540 | 4/1997 | Civanlar et al. | 395/200.11 |

OTHER PUBLICATIONS

■Domain Names—Concepts and Facilities■ by P. Mockapetris, IBM RFC1034, Nov., 1987; available on Internet World Wide Web at FTP address nic.ddn.mil or nisc.junc-.net.

*Primary Examiner*—Melvin Marcelo
*Attorney, Agent, or Firm*—Jeanine S. Ray-Yarletts

[57] ABSTRACT

This invention deals with an enhancement to the name resolution capabilities of existing TCP/IP networks. More specifically, it allows a host which is connected to a private network to be located through a connection to a different private network or a public network, such as the internet. This is achieved by allowing the host to be configured with more than one primary domain name server. This can be done using existing TCP/IP communications protocol and does not require a change to any code outside of the host. The host can also define one or more alternate domain name servers for each of the primary domain name servers. The definition of multiple primary and secondary domain name servers for each host allows the name of the host to be located, without a degradation in performance, if it is located or defined in any of the primary domain name servers.

10 Claims, 3 Drawing Sheets

FIG. 2 - PRIOR ART

TCP/IP HOST NAME RESOLUTION FOR MACHINES ON SEVERAL DOMAINS

BACKGROUND OF THE INVENTION

TCP/IP has become a predominant communications protocol in the telecommunications world today. It allows users to communicate world-wide using a single protocol over diverse transmission networks. A standard feature of TCP/IP is host address resolution. In host address resolution, the network address, also known as the IP address, of a host is determined from its name. For example, the name joe.raleigh.ibm.com might resolve to the network address 9.67.111.80. Address resolution must be done before a TCP/IP connection can be established with the destination host. The name resolution information may be stored locally in a hosts file on each host, but this approach is not practical for large networks. More commonly, this information is stored in the name resolution master file of a domain name server.

The terms domain and domain name are used in a variety of contexts in the field of computer networking, but are used here in the same way as described in the Internet standards document "Request for Comments (RFC) 1034". Conformance to RFC 1034 enables the same name space to be used with different protocol families in dissimilar networks and applications.

TCP/IP host and domain names are of the format label1.label2.label3 wherein each label is a string of alphanumeric characters beginning with a letter and possibly containing embedded hyphens. A domain name consists of a label or of several labels connected by periods. Domain names are organized in a hierarchical tree of subdomains. For example, domain bbbbbb.aaaaaa is a subdomain of aaaaaa, and domain cccccc.bbbbbb.aaaaaa is a subdomain of bbbbbb.aaaaaa. The TCP/IP name space is administered by the Internet Network Information Center (InterNIC). Internet standards direct that all domain names must be registered with this agency so that name conflicts do not occur.

In the TCP/IP name resolution process, a name resolution query is sent to the name server by the host, and if the query is successful, the name server returns a reply containing the host address. A particular name server may contain information on only a subset of the domain namespace, but the name server typically belongs to a hierarchy of name servers, and if it does, either it communicates with other members of the hierarchy to attempt to resolve host names, or it returns information referring the client to another server in the hierarchy, so that the client can redirect the query.

In addition to resolving addresses from host names, the domain name server also can resolve host names from addresses, can resolve host addresses for electronic mail destinations, and can answer several other types of queries. Name resolution is described in detail in the Internet standards document RFC 1034.

The design of the name resolution process assumes that the local host is connected to a single domain, and that the domain name server can resolve addresses for all the hosts on the TCP/IP wide area network. This assumption is explicitly spelled out in section 2.4 of RFC 1034:". . . in general a particular name server has complete information about a subset of the domain space, and pointers to other name servers that can be used to lead to information from any part of the domain tree. . . . The domain space consists of a single tree and the user can request information from any section of the tree." This assumption is not always true, and the operational problems and limitations of the current art resulting from this assumption are what this invention remedies. For example, a TCP/IP host may be connected to two separate networks and may need to contact destination hosts on both networks simultaneously. The domain name servers on one network may not be able to resolve host addresses for hosts on the other network. This problem occurs today when a TCP/IP host is connected simultaneously to a private network and to the Internet. The Internet, as the term is used in this application, is the world-wide communications network that is accessed by government, business, universities and individuals. It provides access to a multitude of information using the TCP/IP protocol as its transport mechanism. Internet domain name servers cannot resolve host names on private networks, and private network name servers usually cannot resolve Internet host names. As a result, with the current state of the art, a TCP/IP host that is simultaneously connected to two different TCP/IP domains may be unable to resolve addresses for host names in one of those domains. If the host is configured to use domain name servers on one of the domains, it is unable to resolve addresses for hosts on the other domains.

The problem described does not prevent the host from being physically connected to several networks, or from sending data packets on either network. But it disables successful communication anyway, by preventing the host from determining the correct destination address for some of the packets. In such a configuration, contrary to the design assumptions of the current art, the domain space is partitioned into several subtrees, which may be either overlapping or entirely disjoint, and the name resolution system that provides domain name information for one of the subtrees has no access to domain name information for the other subtrees.

There are several known ways to work around this problem, but all are inadequate. For example, it is possible to specify alternate domain name servers, but if the domain name server initially queried returns a reply that the host name is not known, no other domain name servers are queried, because according to the design assumptions of RFC 1034, the initial reply is based on information about the complete namespace, and is therefore authoritative. Alternate name servers are only used if the primary name server is unavailable for some reason and does not respond to the query. An alternative is to add host names to a host names file on the local host, which is queried when the name server is unable to resolve a name. This host names file is manually updated by the systems programmer. If the networks involved are large, the local host's names file may grow to thousands of entries. Files of this size are extremely difficult to keep current and accurate. When a domain name server returns a reply that a host is unknown, the reply typically comes back several seconds after the request because the domain name server forwards the request to many other servers on the network and waits for replies. Only when no positive reply is received is the local host's names file read. This delay creates performance problems, even if the local host's names file does contain the needed host name and address.

BRIEF DESCRIPTION OF THE INVENTION

The invention is an enhancement to TCP/IP address resolution. In this enhancement, the local host may be configured with two or more primary domain name servers, one for each domain to which the host is connected. The names of the domain name servers for each domain are kept in a list. The first member of each name server list is the name of the primary server to be used on that domain. The other names on the list are alternate domain name servers to be queried if the primary name server does not respond to the query for the specified domain. Resolution requests are sent to the primary domain name servers in all the domains simultaneously. If a positive response is received from any of the name servers that are queried, the corresponding address is used. If one of the name servers replies that the host name could not be found, that host name may be on a different domain, and therefore name resolution does not complete until the remainder of the name servers respond or their respective timeout intervals elapse. If one or more of the primary name servers do not respond, requests are sent to an alternate name server for each of those name servers that have not responded. All resolution requests received at a selected server are handled the same way and are described in RFC 1034 (resolution of host names and addresses, resolution of host addresses into names, MX record processing for mail address resolution, etc.). RFC 1034 is hereby incorporated by reference.

Because the name resolution requests are sent simultaneously to name servers on each of the domains to which the host is connected, the invention does not degrade the address resolution performance. The format of the name resolution packet is not changed in any way from the standard IP name resolution packet, so the enhancement can be used on existing TCP/IP networks with existing name servers, and it does not affect any of the other hosts on the network. RFC 1034 states that "We want name server transactions to be independent of the communications system that carries them." This invention preserves that independence, in that queries can be encapsulated in TCP virtual circuits, Universal Datagram Protocol (UDP) datagrams, or other types of communications packets.

Sometimes the host name to be resolved is not a fully qualified TCP/IP domain name such as this-host.raleigh.ibm.com. A short name, such as 'this-host', may be all that is specified. In this case, the host can be configured with a domain name, and the domain name is concatenated to the short host name for name resolution purposes, to create a fully qualified domain name. In fact, a list of possible domain names may be specified. The changes in name resolution here described do not alter this processing. When the simultaneous resolution requests are sent to the name servers, the fully qualified domain name in each request is the same, so that there is no possibility of an ambiguous response.

DETAILED DESCRIPTION OF THE INVENTION

Figure 1:
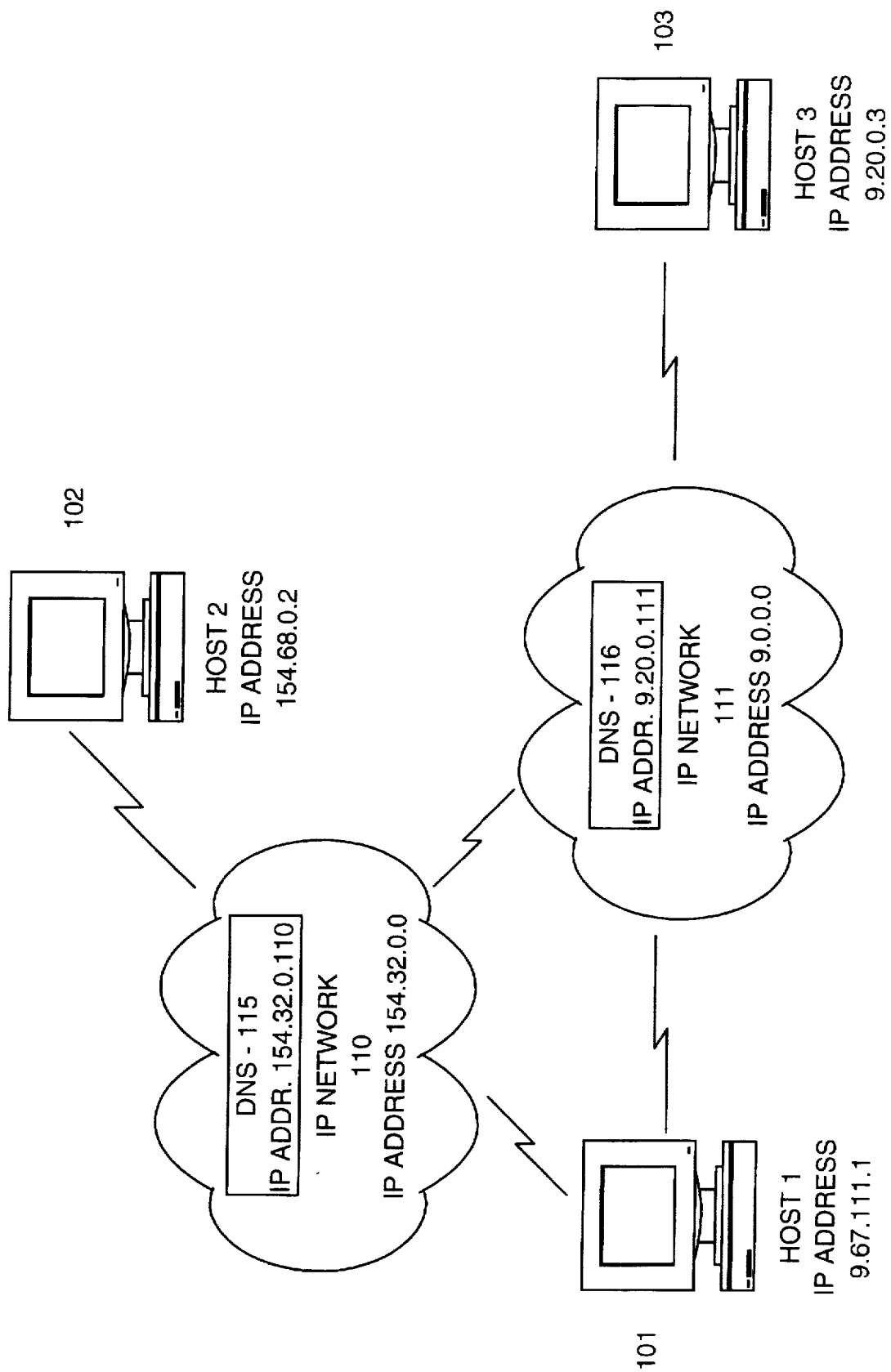
FIG. 1 shows a typical interconnection of IP networks.
Figure 2:
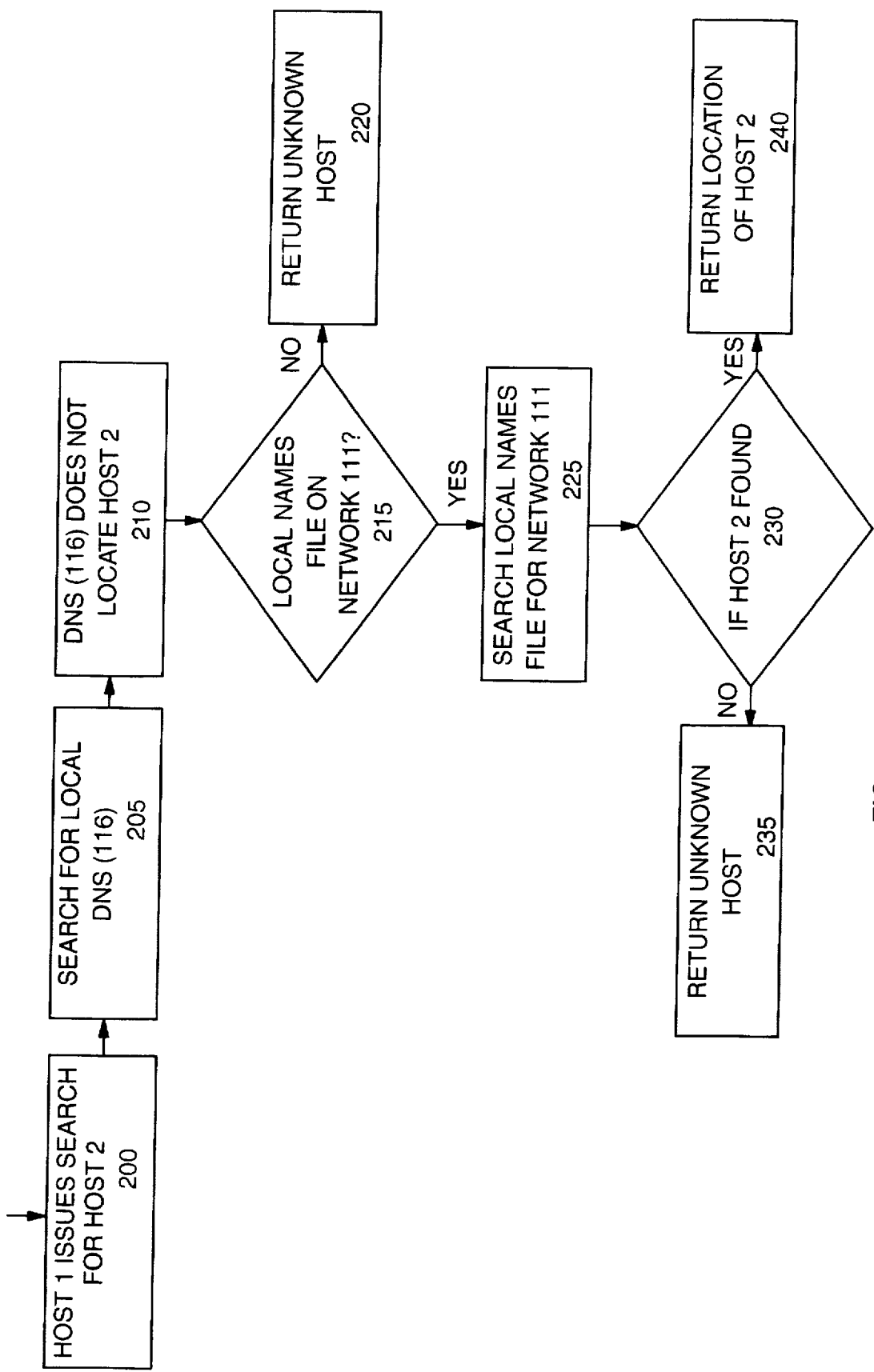
FIG. 2 demonstrates the prior art flow of a search for a destination host address in a configuration containing multiple IP networks.

FIG. 1 shows a typical configuration of multiple IP networks and some representative hosts connected to each of these networks. FIG. 1 displays three hosts 101, 102, 103, although in typical instances of IP networks, each network has hundreds or thousands of hosts associated with it. Host 101, which in the present example has an IP address of 9.67.111.1, is connected to two IP networks, represented in FIG. 1 by 110 and 111. IP network 110 has an IP address of 154.32.0.0 and is served by Domain Name Server (DNS) 115 at network address 154.32.0.110. The other IP network 111 has an IP address of 9.0.0.0 and is served by DNS 116 at network address 9.20.0.111. Host 102, which in the preferred embodiment has an IP address 154.68.0.2, is connected to network 110, and host 103, which in the illustrated configuration is at IP address 9.20.0.3, is connected only to network 111. These connections may be direct physical links, in which case host 101 would be a "multi-homed" host directly attached to both networks 110 and 111, but in the general case connections are indirect ones through IP routers. Domain Name Server 115, residing on network 110, can resolve the address of host 102 from its name. Domain Name Server 116, residing on the network 111, can resolve the address of host 103 from its name. Using prior art techniques, DNS 116 cannot resolve the address of host 102, nor can any of the name servers with which DNS 116 communicates. Similarly, DNS 115 and the name servers with which it communicates have no information about host 103. This very common condition may occur when host 101 and host 102 are on different private networks, or when host 101 is on a private network and host 102 is on the Internet. Under the prior art process, a name space search by host 101 for host 102 would proceed as shown in FIG. 2.

Assume that host 101 is configured to query name server 116 or some other name server in network 111, so that it can communicate with host 103 and other hosts on that network. As demonstrated in FIG. 2 at step 200, an application program on host 101 attempts to establish communication with host 102, and first issues a name server query to name server 116 in order to determine the address of host 102. This causes name server 116 to search its master file for host 102, and (when this fails) to query other name servers as indicated by step 205. Since host 102 is not known to the name servers on network 111, the query fails as shown at step 210 resulting in an "unknown host" reply being returned from domain name server 116 to host 101. Next the name resolution code on host 101 checks to see if there is a local names file on host 101 as indicated by step 215. If there is not, the resolution of the name of host 102 fails and "Unknown host" is returned as shown in step 220. If there is a local names file available for host 101, then a search is made of that file for host 102 at step 225. If someone had manually added host 102 to the names file, this process would resolve the address of host 102; otherwise host 102 would still be unknown. If host 102 is found in the local names file in step 230, then the address of host 102 is returned to the calling program in step 240; otherwise name resolution fails and at step 235 the host is determined to be unknown. It is possible to configure host 101 to use name server 115 instead of 116, in which case it will locate host 102—but if this is done host 101 will not be able to resolve the name of host 103 and other hosts on network 111.

As is obvious from FIG. 1, there is a communications path between host 101 and host 102, and if host 101 can resolve the address of host 102, the prior art process provides for a way to route data packets between hosts 101 and 102. The problem under the prior art process is that host 101 cannot reliably resolve the address of host 102, except via a configuration change which disrupts communications with the rest of network 111. Also, there is no a priori way to know which domain name server should be used, based on the name to be resolved.

Figure 3:
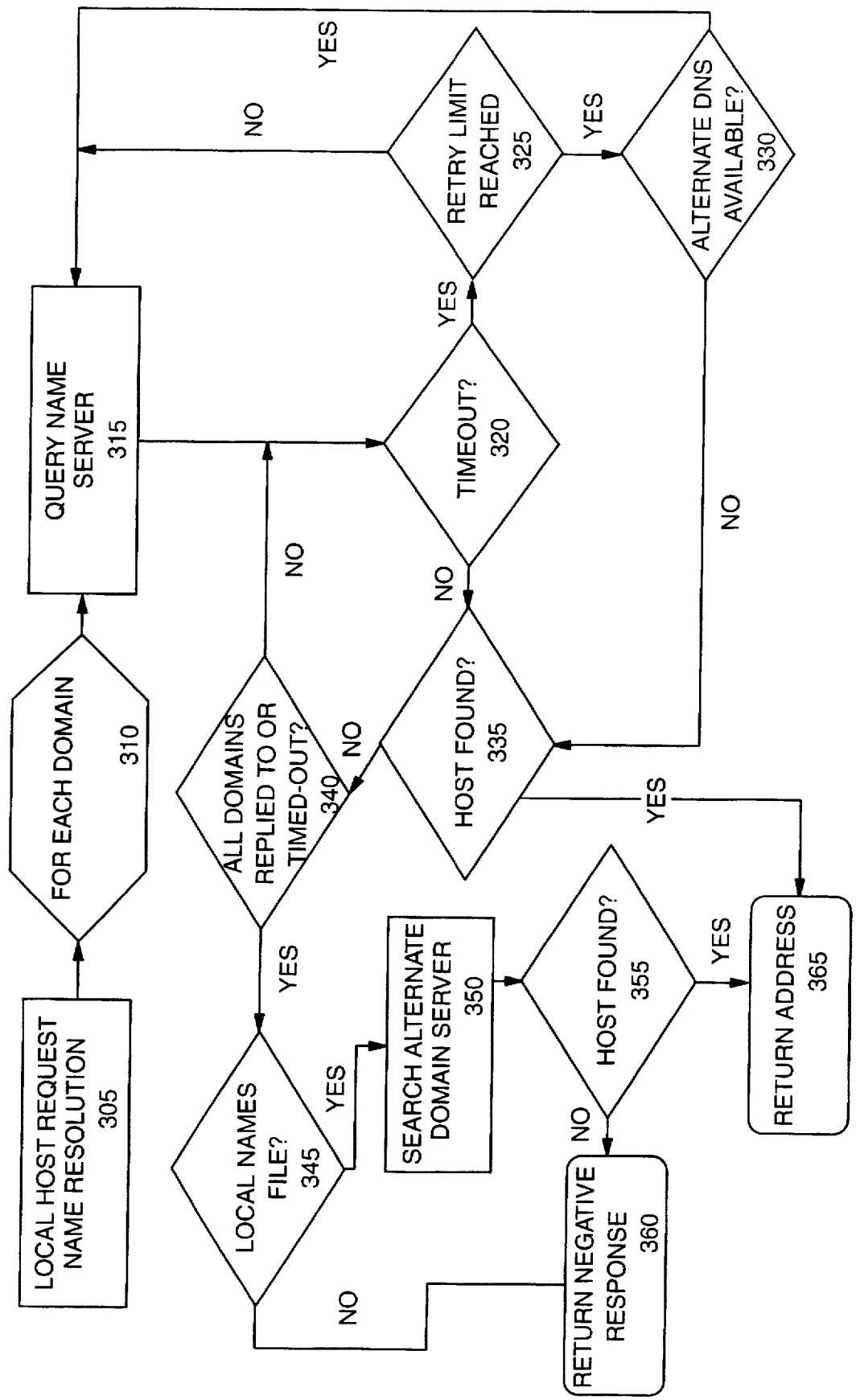
FIG. 3 depicts the logic traversed in locating the address of a destination host in the preferred embodiment of the present invention.

The present invention is a way of allowing any host to be a member of multiple domains, each domain having a primary domain name server and any number of alternate name servers, and allowing the name resolution for this host to span the multiple domains without requiring significant modification to the existing search logic. As shown in FIG. 3, an application program on host 101 attempts to establish communication with host 102, and first issues a name server query at step 305. When this query is initiated, it is replicated for each of the domains to which the local host is connected in step 310. These replicated queries are sent to the primary domain server for each of the domains of which the host is a member in step 315. For example, in the configuration of FIG. 1, the query would be sent to DNS 115 and to DNS 116. The process then waits for a response to be received from any of the name servers queried or for their timeout intervals to elapse as indicated at step 320. Suppose a timeout occurs without a response having arrived from any of the name servers. If the retry limit has not been reached in step 325, then the query is retried several times, in case the original query packet was lost in transmission. If the retry limit has been reached in step 325 without a response, a check is made for alternate name servers for each of the domains that failed to respond as indicated in step 330. If such alternate servers exist, they are sent copies of the original query in step 315. Suppose, on the other hand, that a response is received before the timeout interval elapses. If the host address is found, that address is immediately returned in step 365 without waiting for responses from name servers on other domains. If the server replies that the host is unknown, then the process waits for replies from name servers on other domains, where the host may reside in step 340. If the query fails for the name servers on all of the domains, because each name server reports that the host is unknown or times out, a check is made for a local host names file in step 345. If the file is present, it is searched for the address of the remote host in step 350. If the host is found in step 355 the address is returned in step 365. If it is not found, or if no local names file is present, the routine returns a negative response in step 360 with an error code indicating that either the host was not found or that a timeout occurred.

A negative response to the search is not returned to the initiating host unless a domain name server for each of the domains returns a negative response. A positive response from any of the domain name server indicates that the name has been found.

While the invention has been particularly shown and described with reference to a preferred embodiment, it will be understood by those skilled in the art that various changes in form and detail may be made therein without departing from the spirit and scope of the invention.

I claim:

1. In a TCP/IP communications network containing more than one domain and having at least one local TCP/IP host, said local TCP/IP host being connected to multiple of said more than one domains and configured to use a primary domain name server and zero or more alternate domain name servers for each of the multiple connected domains, said local TCP/IP host having a name resolver program, a method for host address resolution comprising sending a name resolution query for a specified name originating with an application program concurrently to each of the primary domain name servers by the name resolver program;

if a positive reply to the name resolution query is received from any of the primary domain name servers, returning the resolved host address information in the reply from the resolver program to the application program.

2. The method for host address resolution of claim 1, further including:

if a reply is not received from each primary domain name server within a specified period of time, determining if an alternate domain name server is available for any of the domains from which no reply was received;

if there is an alternate domain name server available for any of the domains that did not reply, sending the name resolution query for the specified name to each such alternate domain name server; and if no alternate domain name servers are available, returning a first negative reply received from said domain name servers by said resolver program to said application program.

3. The method for host address resolution of claim 2, wherein:

said specified name is a short name;

said local TCP/IP host is configured with a domain name to use in resolution of said short name; and said name resolver program concatenates said short name with said configured domain name prior to sending the name resolution query to the domain name servers.

4. The method for host address resolution of claim 2, wherein:

said specified name is a short name;

said local TCP/IP host is configured with a list of domain names to use in resolution of said short name;

said name resolver program concatenates said short name to the configured domain name at the top of said list of domain names prior to sending the name resolution query to the domain name servers; and if no positive reply is received from any domain name server, and if at least one negative reply is received, said name resolver program concatenates said short name with the configured domain name next in said list of domain names and resends said name resolutions query.

5. A TCP/IP communications network comprising:

two or more hosts;

two or more domains;

each of said domains containing a primary domain name server;

means for initiating a name resolution query from one of said hosts for a specified name, said name resolution query being sent concurrently to said primary domain name server in each of said domains.

6. The TCP/IP communications network as claimed in claim 5, further comprising:

means for sending said name resolution query for said specified name to an alternate domain name server for each primary domain name server when no reply is received within a specified period of time.

7. The TCP/IP communications network as claimed in claim 5, further comprising:

means for returning a negative response to the name resolution query if there are no alternate domain name servers available for said domain and a positive response is not received within a specified period of time.

8. In a TCP/IP communications network containing a plurality of domains and one or more local hosts which may be connected to multiple domains, an address resolution system for one or more of the domains, said system including:

a primary domain name server for each said domain including a database having entries which correlate host names to addresses;

means for concurrently sending a name resolution query for a specified name to each of said primary domain name servers; and means for returning a host address if the specified name in the name resolution query is contained within the database at any of said primary domain name servers.

9. The address resolution system of claim 8, including:

a timer mechanism for determining if one or more domain name servers have failed to reply to said name resolution query within a specified time; and means for transmitting said name resolution query to an alternate domain name server if no reply to said name resolution query has been received by the expiration of said specified time.

10. A host computer connected to a plurality of domains using a TCP/IP protocol, each domain containing a primary domain name server and zero or more secondary domain name servers, said host computer comprising:

means for transmitting a name resolution query from said host computer concurrently to each of said primary domain name servers;

timer means for detecting if any of said primary domain name servers fail to reply to said name resolution query within a specified time interval;

means for resending said name resolution query to each said primary domain name server a predetermined number of times if said each primary domain server fails to reply within said specified time interval; and means for resending said name resolution query to each said secondary domain name server if said primary domain name server for said domain fails to reply after said predetermined number of times.

* * * * *